United States Patent
Lundell et al.

(10) Patent No.: US 7,621,308 B2
(45) Date of Patent: Nov. 24, 2009

(54) TIRE BUILDING CORE LATCHING AND TRANSPORT MECHANISM

(75) Inventors: Dennis Alan Lundell, Akron, OH (US); William Dudley Currie, Stow, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 412 days.

(21) Appl. No.: 11/292,991

(22) Filed: Dec. 2, 2005

(65) Prior Publication Data

US 2007/0125496 A1 Jun. 7, 2007

(51) Int. Cl.
*B29D 30/12* (2006.01)

(52) U.S. Cl. ........................... 156/417; 156/414

(58) Field of Classification Search ................ 156/417, 156/419, 420, 414, 111, 396; 425/55–57; 249/184
See application file for complete search history.

(56) References Cited

U.S. PATENT DOCUMENTS

| | | | |
|---|---|---|---|
| 1,179,898 A | 4/1916 | Coffey et al. | |
| 1,388,255 A | 8/1921 | Hardeman | |
| 3,322,599 A * | 5/1967 | Bishop | 156/417 |
| 3,560,302 A | 2/1971 | Missioux | 156/515 |
| 3,607,558 A | 9/1971 | Nebout | 156/415 |
| 3,684,621 A | 8/1972 | Frazier et al. | 156/401 |
| 3,767,509 A | 10/1973 | Gazuit | 146/415 |
| 3,833,445 A | 9/1974 | Mallory et al. | 156/401 |
| 3,868,203 A | 2/1975 | Turk | 425/242 |
| 4,007,080 A | 2/1977 | Klöpper | 156/396 |
| 4,043,725 A | 8/1977 | Schmidt | 425/542 |
| 4,045,277 A | 8/1977 | Habert et al. | 156/417 |
| 4,083,672 A | 4/1978 | Vaishnav | 425/457 |
| 4,211,592 A | 7/1980 | Grawey | 156/123 |
| 4,798,647 A * | 1/1989 | Haas | 156/414 |
| 5,201,975 A | 4/1993 | Holroyd et al. | 156/124 |
| 5,853,526 A | 12/1998 | Laurent et al. | 156/398 |
| 6,113,833 A * | 9/2000 | Ogawa | 425/56 |
| 6,234,227 B1 | 5/2001 | Bosseaux | 156/398 |
| 6,250,356 B1 | 6/2001 | Cordaillat et al. | 156/400 |
| 6,318,432 B1 | 11/2001 | Caretta et al. | 152/552 |
| 6,406,575 B1 | 6/2002 | Baumgarten et al. | 156/96 |

FOREIGN PATENT DOCUMENTS

| | | |
|---|---|---|
| DE | 2002294 | 7/1971 |
| GB | 1524369 | 9/1978 |
| WO | WO 01/62481 A1 | 8/2001 |
| WO | 03103935 | 12/2003 |
| WO | WO 2005/009724 A1 | 2/2005 |

OTHER PUBLICATIONS

European Search Report, completed Feb. 15, 2007.

* cited by examiner

*Primary Examiner*—Geoffrey L Knable
(74) *Attorney, Agent, or Firm*—Richard B. O'Planick

(57) ABSTRACT

A tire building core assembly includes a shell assembly is formed by a plurality of shell segments and includes a central spindle-receiving throughbore. Two spindle units meet in axial alignment within the shell assembly throughbore and retain the shell segments in an expanded configuration forming a toroidal tire building surface. An open socket may be formed in a protruding end of one or both spindle units, the socket configured to couple with an end of an external arm mechanism. A latching mechanism moves between engaged and disengaged positions for releasably couple the one spindle unit to the second spindle unit within the shell assembly throughbore.

12 Claims, 13 Drawing Sheets

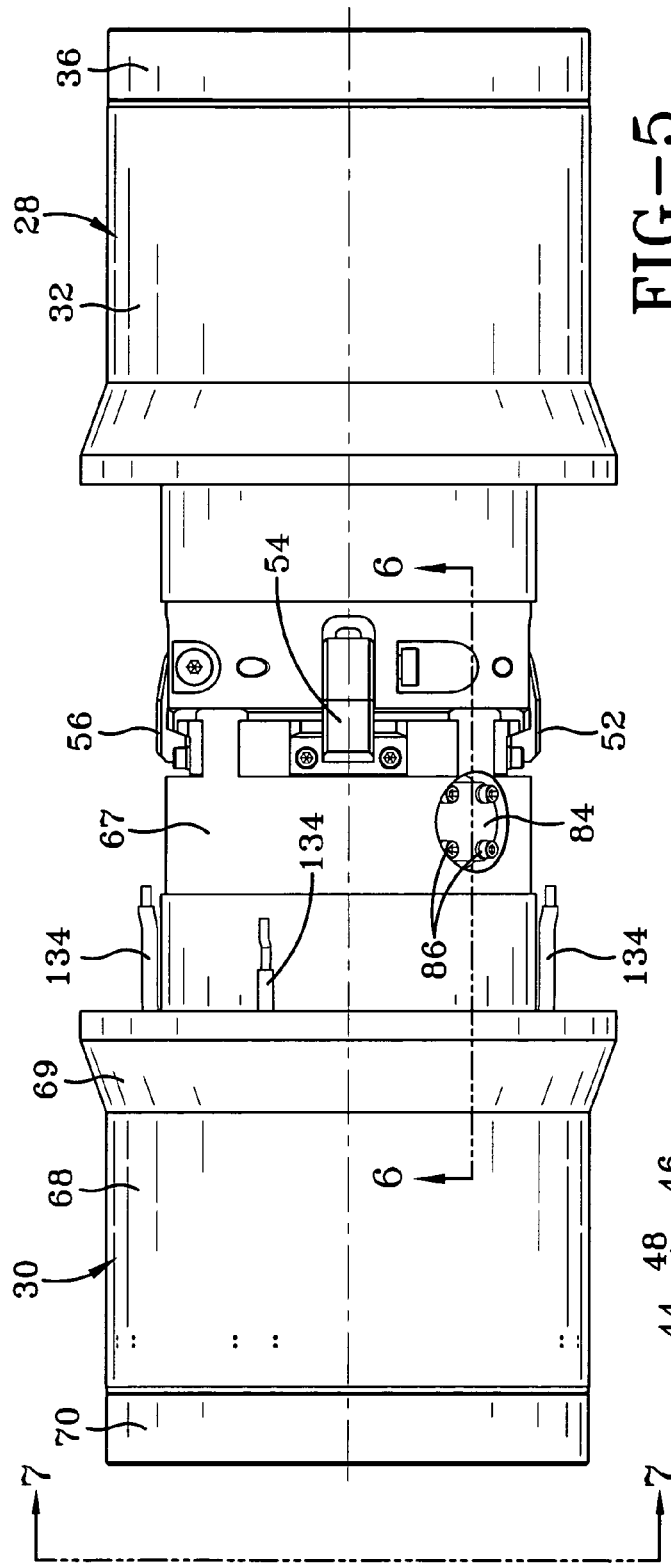
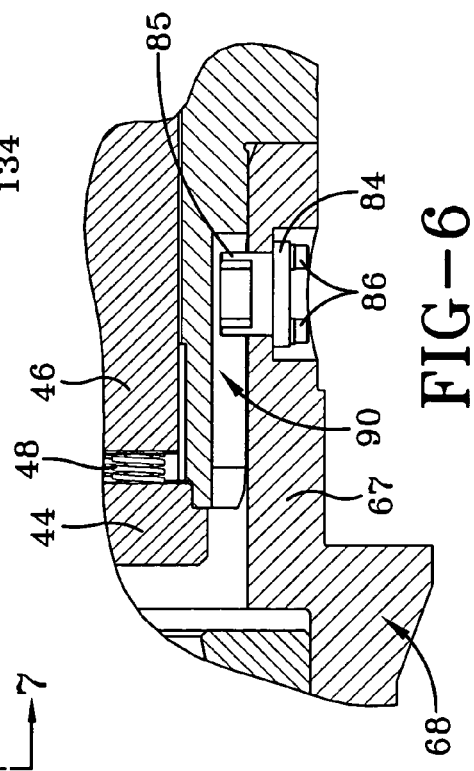

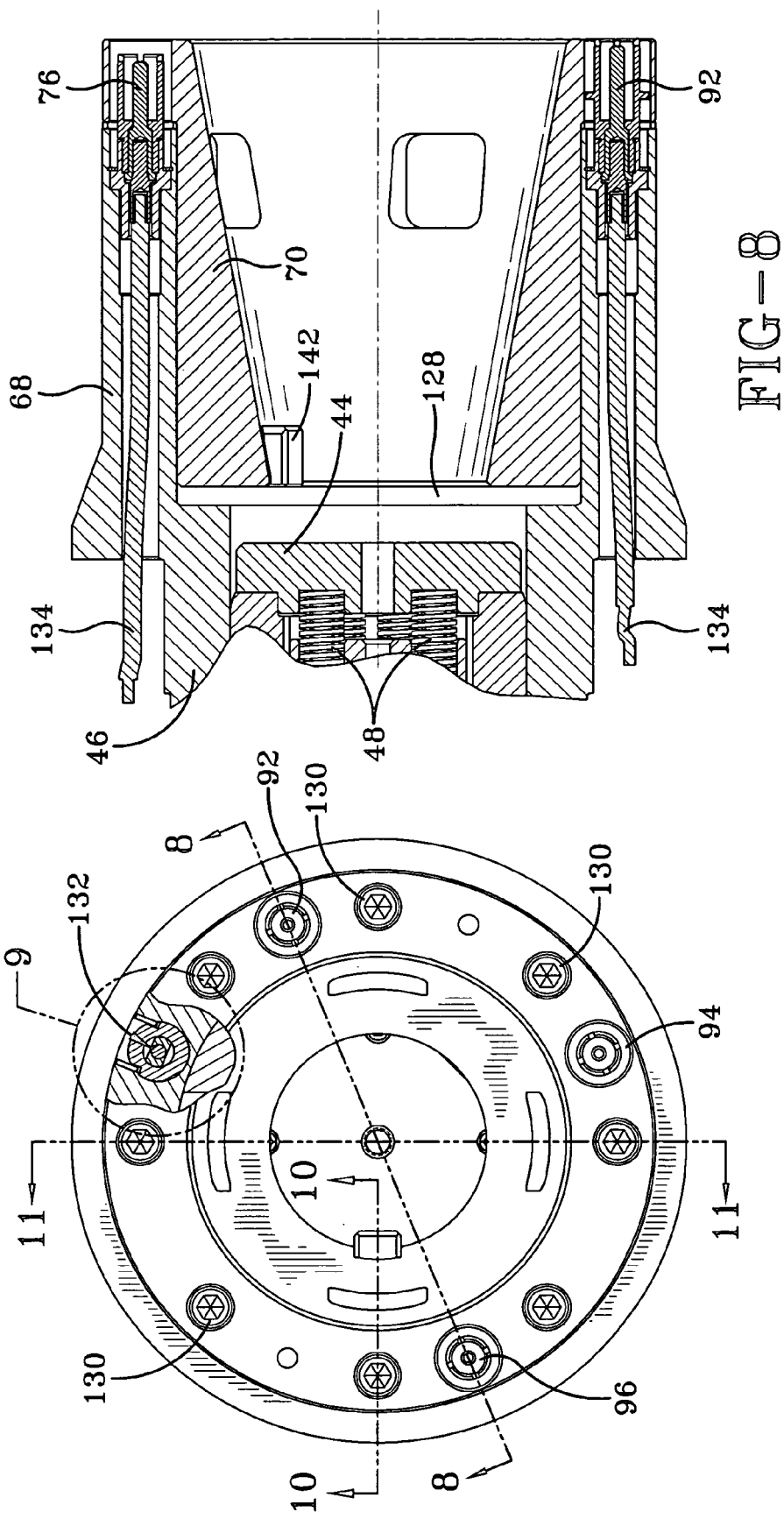

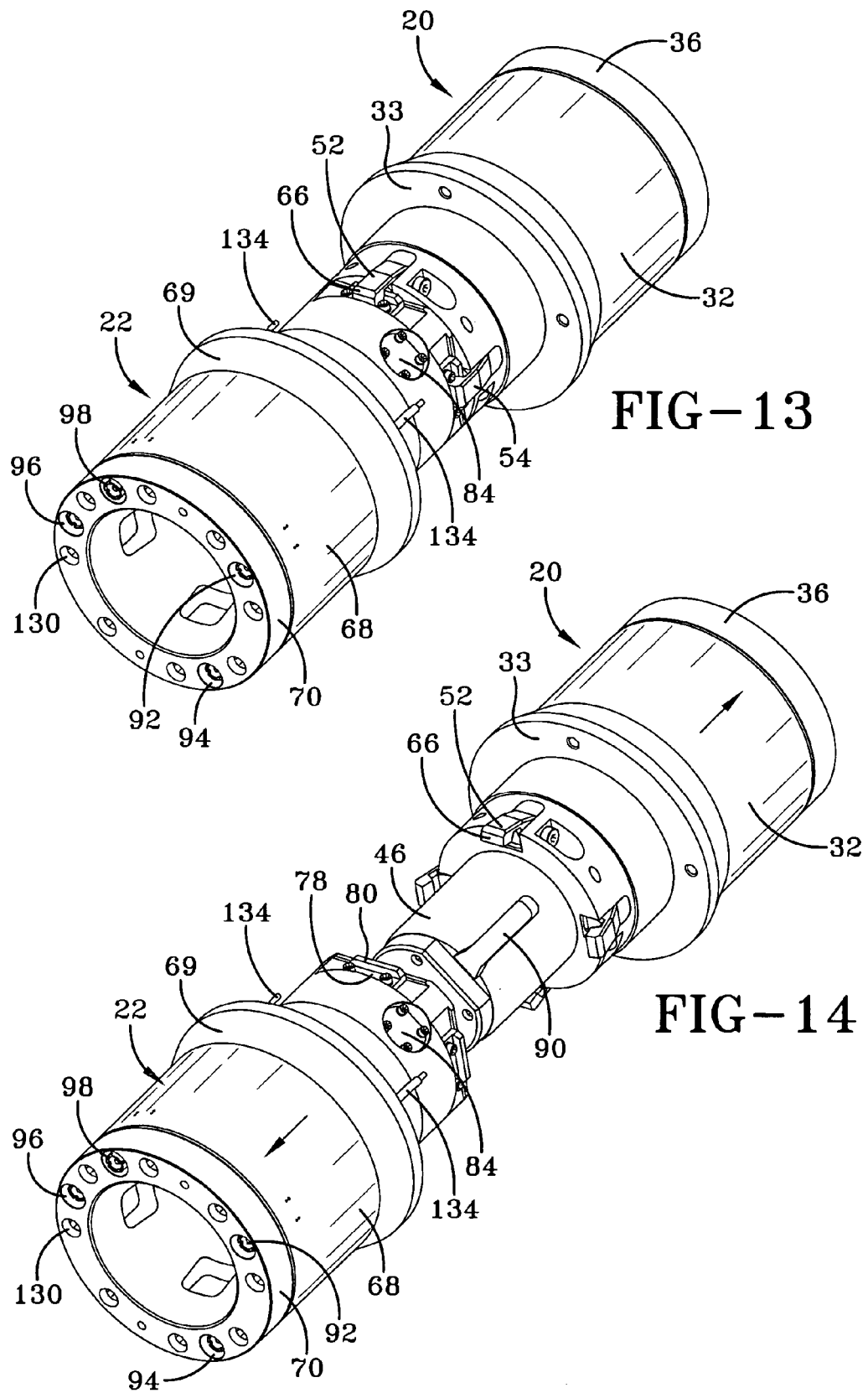

us 7,621,308 B2

TIRE BUILDING CORE LATCHING AND TRANSPORT MECHANISM

FIELD OF THE INVENTION

The invention relates generally to a tire building core for use in the construction of an uncured tire and, more specifically, to a tire building core latching and transport mechanism.

BACKGROUND OF THE INVENTION

Historically, the pneumatic tire has been fabricated as a laminate structure of generally toroidal shape having beads, a tread, belt reinforcement, and a carcass. The tire is made of rubber, fabric, and steel. The manufacturing technologies employed for the most part involved assembling the many tire components from flat strips or sheets of material. Each component is placed on a building drum and cut to length such that the ends of the component meet or overlap creating a splice.

In the first stage of assembly the prior art carcass will normally include one or more plies, and a pair of sidewalls, a pair of apexes, an innerliner (for a tubeless tire), a pair of chafers and perhaps a pair of gum shoulder strips. Annular bead cores can be added during this first stage of tire building and the plies can be turned around the bead cores to form the ply turnups. Additional components may be used or even replace some of those mentioned above.

This intermediate article of manufacture would be cylindrically formed at this point in the first stage of assembly. The cylindrical carcass is then expanded into a toroidal shape after completion of the first stage of tire building. Reinforcing belts and the tread are added to this intermediate article during a second stage of tire manufacture, which can occur using the same building drum or work station.

This form of manufacturing a tire from flat components that are then formed toroidally limits the ability of the tire to be produced in a most uniform fashion. As a result, an improved method and apparatus has been proposed, the method involving building a tire sequentially on a core or toroidal body. The core or toroidal body rotates about its axis as tire components are applied layer by layer to the outer core surface. When the tire build procedure is completed on the core, the green tire will have a shape and dimension only slightly smaller than the finished tire. The aforementioned variances resulting from conventional drum expansion are thus eliminated. Building a tire on a core to a final tire shape, dimension, and uniformity therefore allows for improved quality control of the finished product.

Use of a tire building core in conventional tire construction improves the accuracy of tire component placement because the tire is built to a near final shape and dimension. Pursuant to industry convention, the core includes a plurality of segments that unite to form an annular tire building surface in one configuration, and collapse to facilitate removal of the core in a second configuration. The core is typically held together with separate latches on each segment. While working well, separately latching the segments is more complex, expensive, and time consuming than the industry desires. In addition, it is at times necessary to relocate the core assembly and tire during the tire manufacturing process. Conventional core assemblies provide no mechanism for facilitating a convenient and efficient relocation of the core assembly as required.

Accordingly, the industry remains in need of a multi-segment tire building core that assembles quickly and is readily transportable. The components of the core assembly should securely couple in a manner that ensures the unity of the core assembly throughout any necessary relocation. Moreover, the core assembly should maintain the structural integrity of the tire building surface during tire build operation.

SUMMARY OF THE INVENTION

Pursuant to one aspect of the invention, a tire building core assembly includes a shell assembly having a central spindle-receiving throughbore. An elongate spindle assembly is formed by two spindle units. The spindle units extend into the shell assembly throughbore in axial alignment and couple. The shell assembly is formed by a plurality of shell segments and the spindle assembly positioned within the shell assembly throughbore retains the shell segments in the assembled configuration.

Pursuant to another aspect, a rearwardly opening socket in at least one spindle unit receives an end of an external arm mechanism. The arm mechanism couples with the spindle unit and may be utilized in a relocation of the core assembly as necessary during the tire manufacturing process. The rearward spindle socket and the arm mechanism end may be of a complementary frustro-conical configuration and may interlock pursuant to another aspect of the invention.

According to a further aspect of the invention, one spindle unit has a latching mechanism moveable between latched and unlatched positions for releasably coupling the one spindle unit to the opposite second spindle unit. The arm mechanism may carry a latch actuation rod for placing the latching mechanism into the unlatched position. The latching mechanism may include a biasing spring for biasing the latching mechanism into the latched position until the latch actuation rod compresses the biasing spring to move the latching mechanism into the unlatched position.

BRIEF DESCRIPTION OF THE INVENTION

The invention will be described by way of example and with reference to the accompanying drawings in which:

FIG. 5 is side elevation view thereof.

FIG. 6 is a partial sectional view through the view of FIG. 5 taken along the line 6-6.

FIG. 7 is an end elevation of a spindle unit.

FIG. 8 is a transverse section view taken along the line 8-8 of FIG. 7.

FIG. 13 is a right side perspective view of the spindle units shown in the mated configuration.

FIG. 14 is a right side perspective view of the spindle units shown in the unmated configuration.

DETAILED DESCRIPTION OF THE ILLUSTRATIVE EMBODIMENTS

Figure 2:
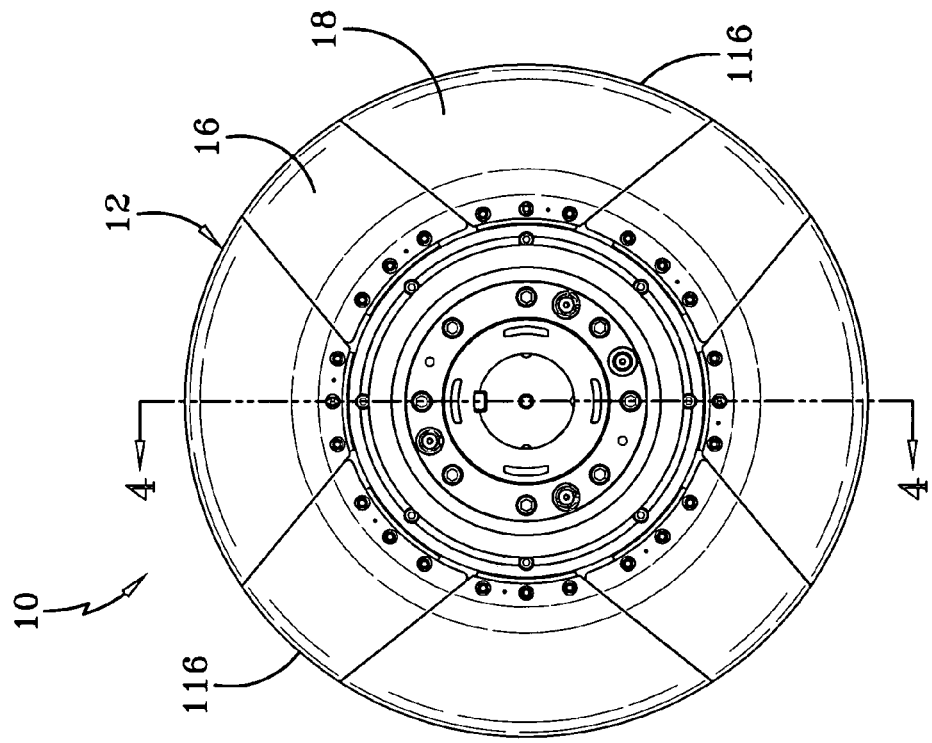
FIG. 2 is a front end elevation view thereof.
Figure 1:
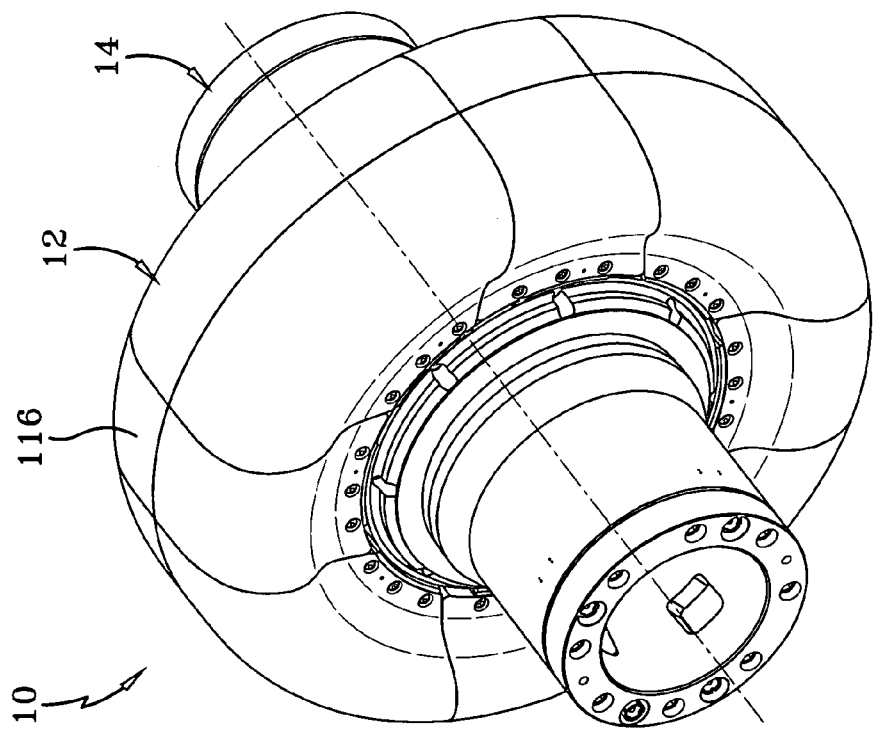
FIG. 1 is an assembled perspective view of a tire building core assembly configured pursuant to the invention.

Referring initially to FIGS. 1 and 2, a tire building core assembly 10 is shown in the assembled configuration. The core assembly 10 includes a shell assembly 12 configured to provide a toroidal form substantially near final shape and dimension of a final tire. The shell assembly 12 allows for mover accurate placement of tire components in the building of an uncured tire because the tire is built to near final shape. The shell assembly receives an elongate spindle assembly 14 through an axial throughbore of assembly 12. The shell assembly 12 is constructed from alternate shell key segments 16 and large shell segments 18. In general, the tire components are assembled to an outer toroidal surface of the shell assembly 12 to form an uncured tire. The core assembly with uncured tire may then be loaded into a mold for curing. During curing, the core assembly 10 provides additional curing heat through heating elements (explained following) located on the inside surface of shell segments 16, 18. The core is removed from the cured tire by disassembling it and removing the core assembly in segments. The segments are removed from the cured tire, starting with wedge shaped key segments 16. Once the key segments are pulled in radially, they may be removed axially from the tire.

Figure 3:
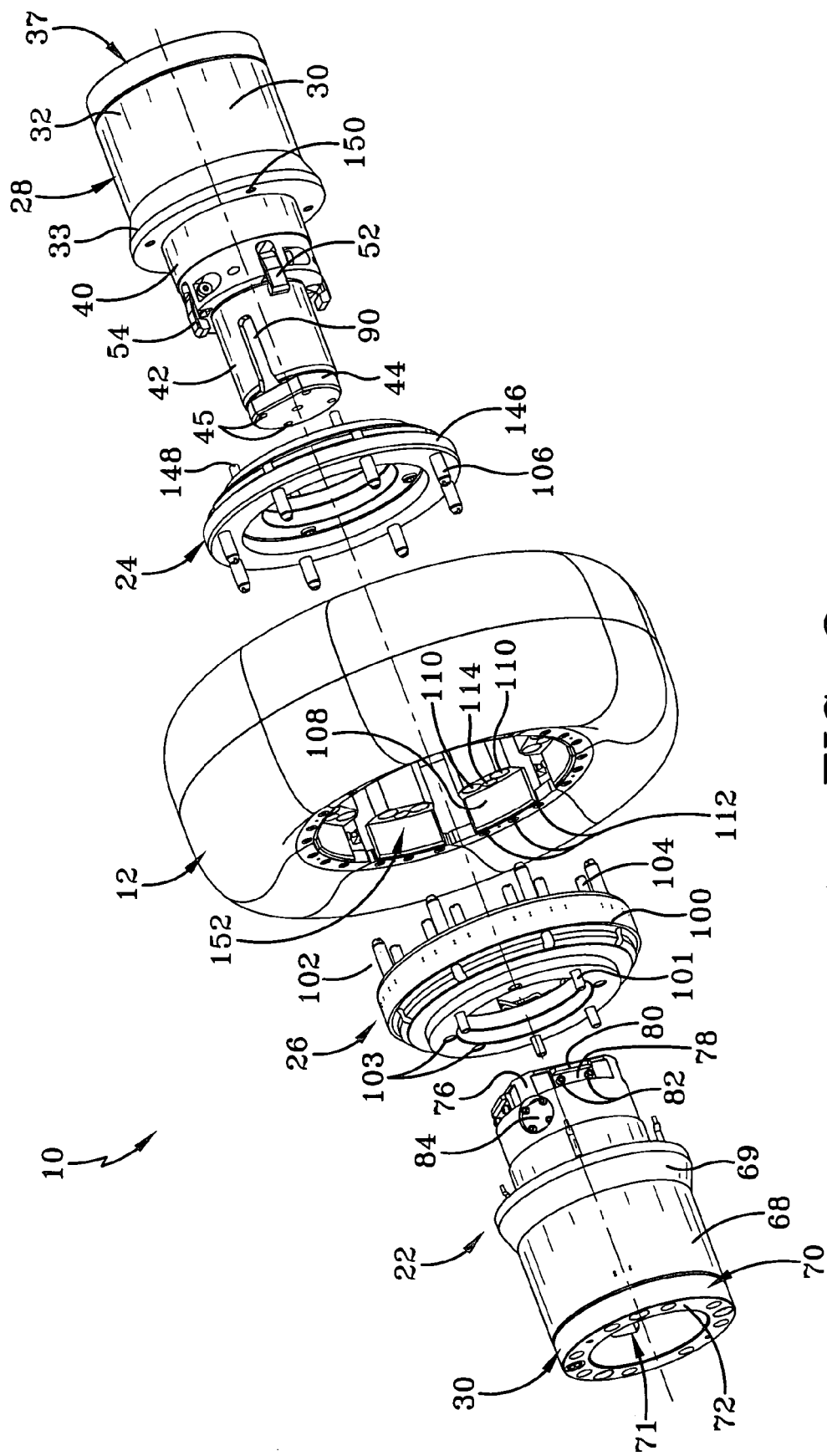
FIG. 3 is an exploded perspective view thereof.
Figure 4:
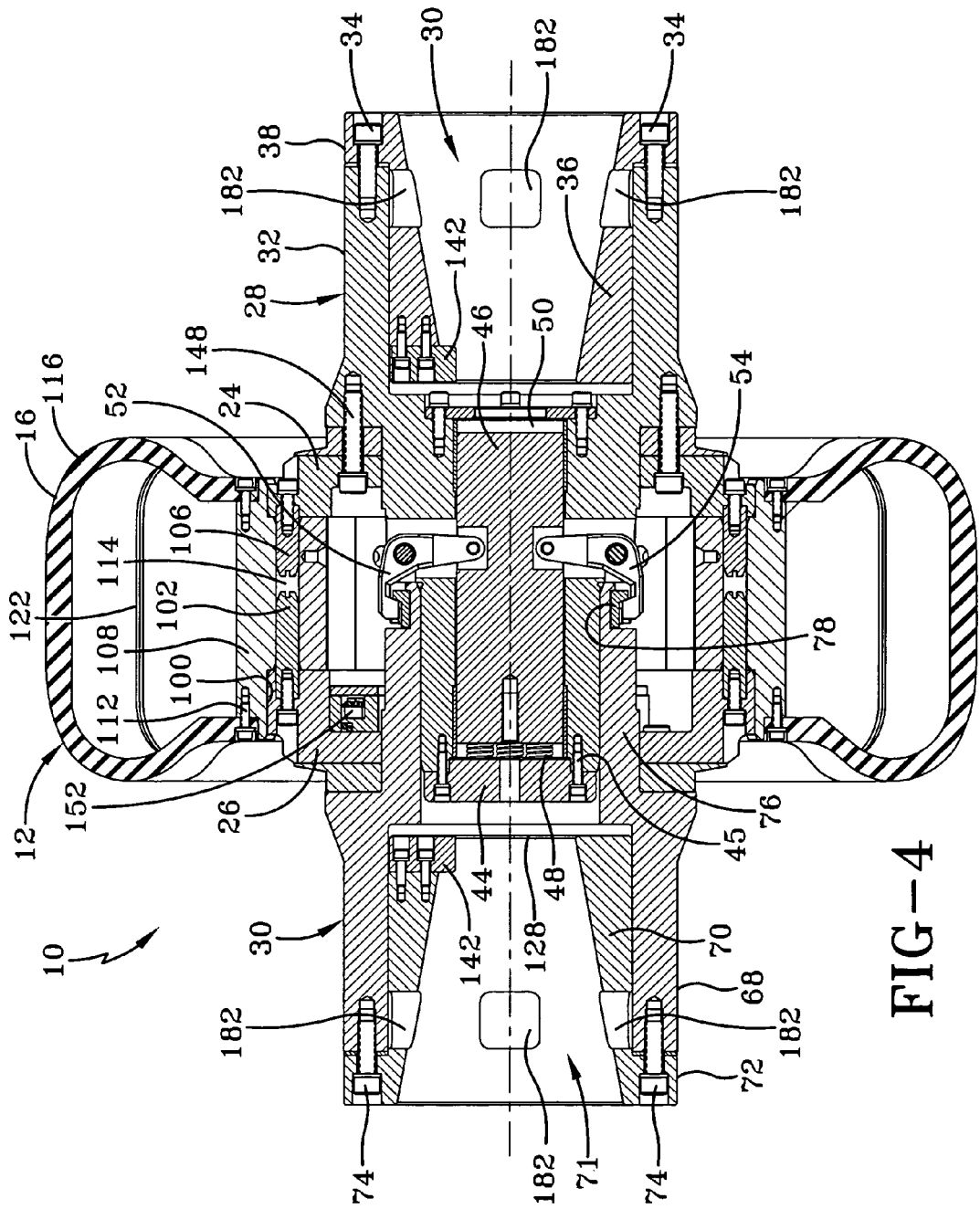
FIG. 4 is a longitudinal section view thereof taken along the line 4-4 of FIG. 2.

Referring to FIGS. 3 and 4, two mating spindle half assemblies 20, 22 (hereinafter referred also to as spindle "units") including respective ring assemblies 24, 26 join to form the spindle assembly 14. Spindle unit assembly 20 is the latching half of the spindle assembly while generally cylindrical unit assembly 22 is the half of the spindle assembly that electrically services the core assembly as will be explained.

The spindle unit assembly 20 includes a generally cylindrical outer housing 28 having a rearward housing portion 32 of larger outer diameter, an intermediate housing portion 40 of reduced outer diameter, and a forward housing sleeve portion 42 of reduced outer diameter. An annular flange 33 is disposed approximately at the intersection of rearward housing portion 32 and intermediate housing portion 40. An insert body 36 is received within the body 32 and attaches to portion 32 by means of a peripheral series of attachment screws 34. The insert body 36 has a conical internal axial passageway 37 that tapers through the insert body 36 to the forward cylindrical sleeve portion 42 of the body 32. Retained within the forward sleeve 42 is an elongate cylindrical actuating shaft 46. Shaft 46 resides within an axial passageway 50 through sleeve portion 42 and extends forward to an end cap 44. The end cap 44 attaches to the forward end of sleeve portion 42 by four screws 45. Four latch members 52, 54, 56, 58 are circumferentially spaced around and are pivotally attached to the intermediate portion 40 of the spindle unit housing 28.

Figure 11:
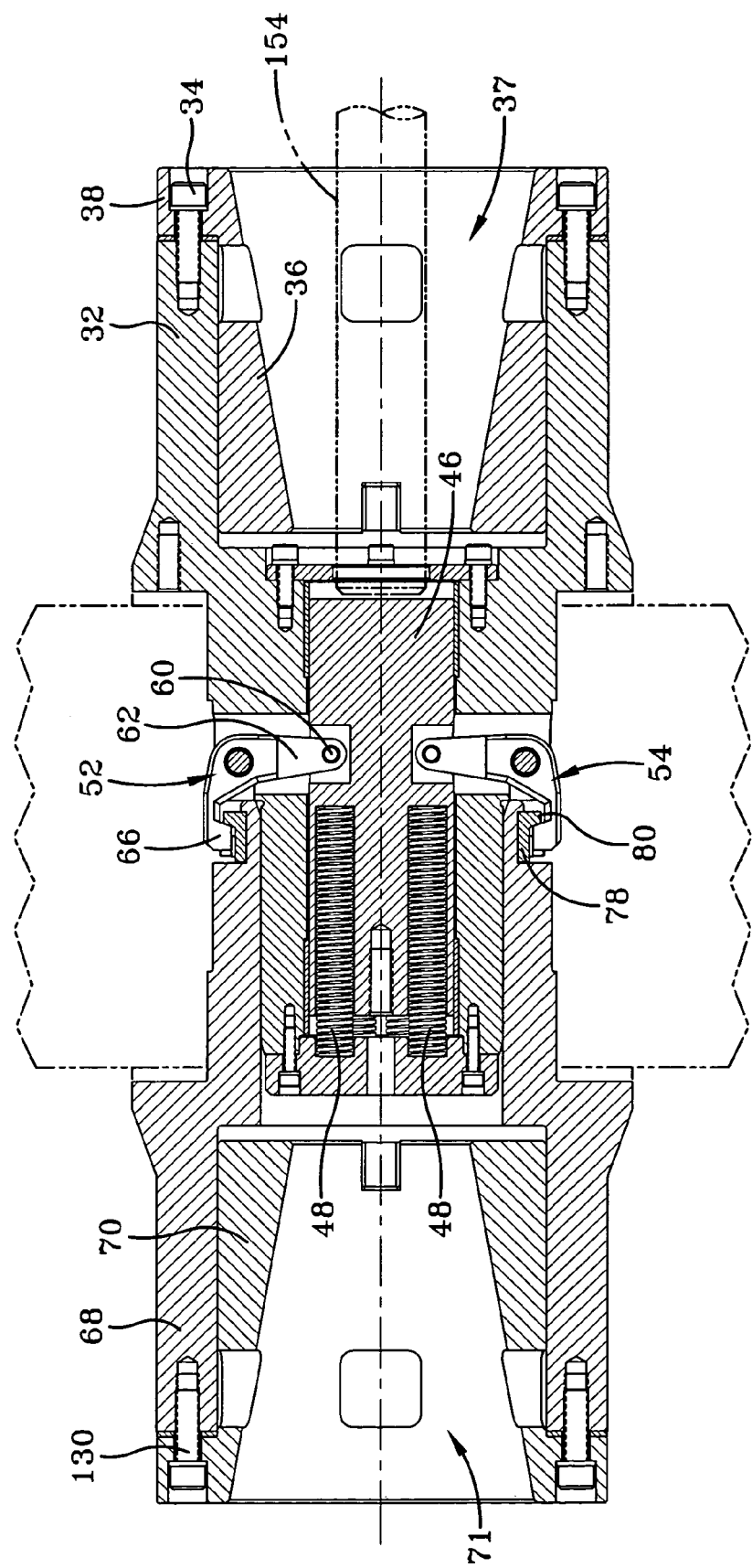
FIG. 11 is a longitudinal section view through the spindle units shown in the mated configuration.

FIG. 11 illustrates the two spindle units 20, 22 in the mated orientation. Each of the four latch members 52, 54 (54, 56 not shown) has an L-shaped latch arm 62 fixedly attached by a pin 60 to a peripheral side of the actuator shaft 46. The latch arm 62 of each latch member has an intermediate elbow portion pivotally attached by a pivot pin 64 to the intermediate portion 40 of the outer housing. At the opposite remote end of the arm 62 is a dependent latch flange 66.

As best viewed from FIGS. 3 and 4, the spindle unit housing 30 of the opposite spindle unit 22 includes a cylindrical housing rearward portion 68 of relatively larger outer diameter, a housing forward portion 67 of reduced outer diameter, and a peripheral circumferential flange 69 disposed between housing portions 67, 68. An insert body 70 is received within the housing portion 68. An outward extending peripheral flange 72 of the insert body 70 abuts against a rearward rim of the housing portion 68, retained by peripherally located assembly screws 74. A conical passageway 71 extends from the rear into the insert body 70. The outer cylindrical housing 68 has a forward portion 76 having a smaller outer diameter. Four latch plates 78, corresponding in location to the four latch members 52, 54, 56, 58, on the opposite spindle unit, are affixed to the forward housing portion 76 by screws 82. Latch plates 78 each provide a raised tapered flange 80 over which the end 66 of a respective latch member 52-58 rides to latch the spindle units 20, 22 together.

In reference to FIG. 5, a keying protrusion 84 is mounted by four screws 86 to face inward from the housing portion 68 proximate the forward end. Keying protrusion 84 has an inward projecting end 88 that aligns and is received within a longitudinal slot 90 formed along an outer peripheral surface of the sleeve portion 42 of the housing 28 of the spindle unit 20. The keying protrusion 84 keys the sleeve portion 42 with the forward end 67 of the housing 68.

With reference to FIGS. 3, 4, 7, and 13, extending within a rearward end of the insert body 70 are peripherally spaced electrical connectors 92, 94, 96, and a ground connector 98. The connectors 92-98 are preferably, but not necessarily, connector pin sockets mating with pins from external power supply lines (not shown). The circumferential ring member 26 mounts over a forward end of the housing 30 and registers against flange 69. An outward annular surface 100 circumscribes the ring member 26. A plurality of pin members 101 extend rearward from the ring member 26 and are received into the forward housing portion 67 to secure the ring assembly 26 to housing 30. Eight peripherally disposed locating pins 102 extend forward from the ring member 26 and a plurality of electrical pins 104 project forward from the periphery of the ring member 26. It is preferred, although not necessary, that two electrical pins 104 be provided for each segment of the shell assembly as will be explained. While the electrical interconnections described herein are specific as to male and female contacts, the invention is not to be so limited. Other electrical connector devices may be employed if preferred.

The ring member 24 of the spindle unit 20 has a circumferentially spaced array of eight locator pins 106 extending forward. The ring member 24 fits over the forward end of the outer housing 28 and abuts against flange 33. Ring member 24 and ring member 26 are intended to remain fixedly assembled to the respective spindle housing 28, 26 of each.

As best seen from FIGS. 3, 4, 15A, and 15B, the shell assembly 12 is configured of circumferential alternating key segments 16 and larger shell segments 18. Each segment is generally hollow and bounded by an outer shell segment surface 116 terminating at opposite segment edges 118. The internal chamber 120 of each segment 16, 18 is closed at a lower end by a base plate member 108 that extends between the shell segment edges 118 and attaches to the segment by three screws 112 on each side. The internal surface of the shell segment is lined with an electrical heating element 122 of a type available commercially within the industry. The element 122 functions to heat the shell segment so as to accelerate tire curing and reduce manufacturing cycle time.

The base plate member of each shell segment is configured having a dependent portion 124. Two electrical connector sockets 110 reside within portion 124 from one end. An alignment throughbore 114 extends through the dependent portion 124 from end to end. The electrical sockets 110 are wired as shown at 126 to deliver electrical power to the heating element 122.

As will be appreciated from FIG. 3, the electrical shell segments unite into an assembled configuration as shown. In the assembled configuration, the shell segments form a toroidal body as shown. The outer surfaces 116 of the shell segments unite to provide a toroidal surface in the form of a tire. Dimensionally, the shape created by the outer surfaces 116 of the shell segments 16, 18 is substantially that of a finished tire. Tire components may be radially applied to the united outer surfaces 116 of the shell segments 16, 18 to form an uncured tire dimensionally equivalent to the finished tire. In the united position shown in FIG. 3, the connector sockets 110 form a circular pattern accessible from one side, that side being the side of spindle half unit 22 in FIG. 3.

Figure 10:
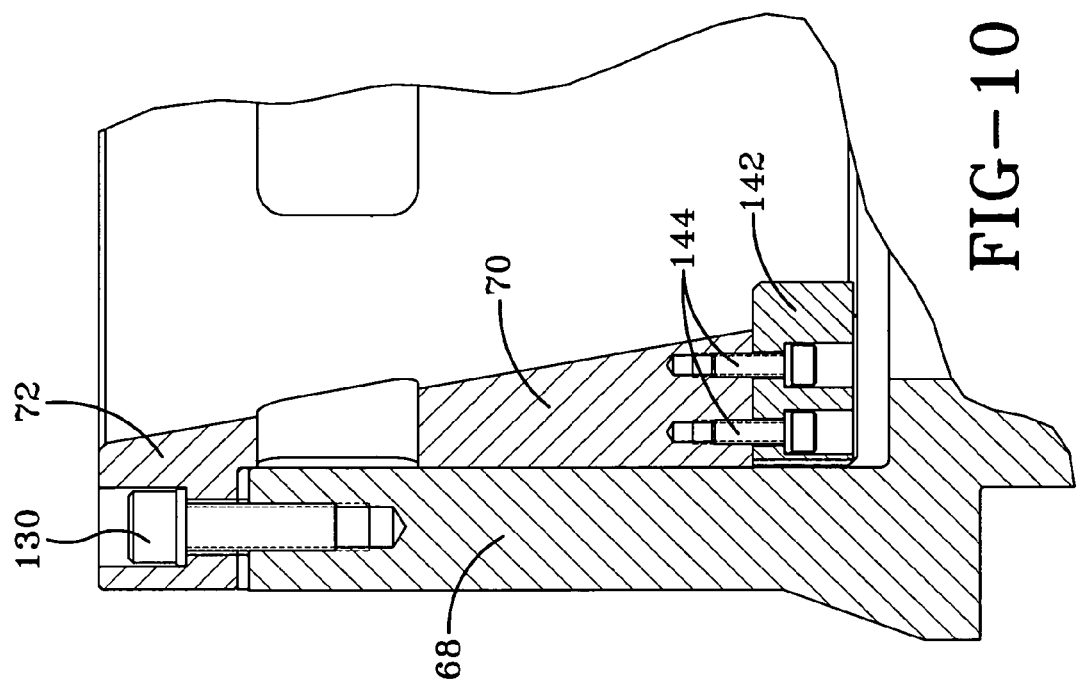
FIG. 10 is a partial section view through the spindle unit of FIG. 7 taken along line 10-10.
Figure 9:
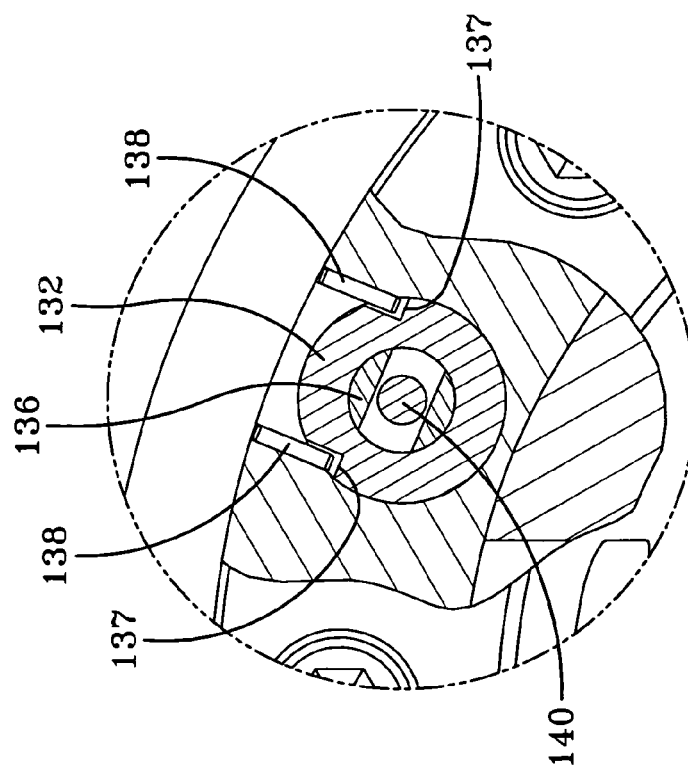
FIG. 9 is a partial section view of a spring pin taken along the line 9-9 of FIG. 7.

Referring to FIGS. 9 and 10, screws 130 attach through the outer flange 72 of insert body 70 into the outer housing portion 68 to affix the insert body 70 to the housing 28. A spring pin 132 is mounted within the inset body 70 and includes outer notches 137 that receive spaced apart elongate flanges 138 to locate the pin 132 within the insert body 70. Internal spring 136 and pin 138 co-operate to lock the insert body 70 within the outer housing portion 68. The forward end of the axial bore 71 of the insert body 70 is enclosed by a base plate 128 affixed to the insert body 70 by means of assembly screws 144.

With continued reference to FIGS. 3 and 4, an outer surface 146 circumscribes the ring member 24. The ring member 24 has a circumferential array of rearwardly directed attachment pins 148 that enter into sockets 150 in flange 33 to attach the ring 24 to the housing 28. Rearwardly directed pins 101 from the ring member 26 project into sockets within the forward end 67 of the housing 30 to securely attach the ring member 26 against flange 69.

The electrical connectors 92, 94, 96, and ground connector 98 are electrically wired by leads 134 through the body 68 and into the ring member 26 where the leads 134 are terminated to the electrical pin members 104. Pin members 104 project forward from the ring member 26 and are arranged so that two pin members 104 align with two electrical sockets 110 per each shell segment 16, 18. Thus, external electrical power lines (not shown) connect to the rearward connectors 92-98 and therefrom via pin members 104 of the ring member 26 to each of the shell segments equipped with a heating element. Separation of the pin members 104 from the shell segment connectors 110 discontinues electrical power to the heating elements whenever disconnection of the ring member 26 from the shell assembly 12 is effected.

Referring to FIGS. 1, 2, 3, and 4, it will be appreciated that the shell segments 16, 18 form a throughbore 150 in the assembled configuration. The spindle units 20, 22 are aligned on opposite sides of the throughbore 150 and moved axially into mating engagement within the throughbore 150 as shown by FIGS. 13 and 14. The spindle units 20, 22 are shown without the ring members 24, 26 attached thereto for the purpose of illustration in FIGS. 13 and 14. As the spindle halves 20, 22 are moved axially together, the actuator shaft 46 of spindle unit 20 is received within the forward axial chamber 50 the opposite spindle unit 22. Keying projection 88 of cylindrical body 68 is aligned within the slot 90 of the actuator shaft 46 and acts to keep the shaft 46 in axial alignment with the actuator chamber 50. Six die spring members 48 are deployed within the chamber 50 in the embodiment shown but more or fewer spring members may be used if desired. The die spring members 48 are seated between the end cap 44 and the forward end of the actuator shaft 46. Accordingly, as the shaft 46 progresses down the axial chamber 50, the spring members 48 load in compression.

Figure 12:
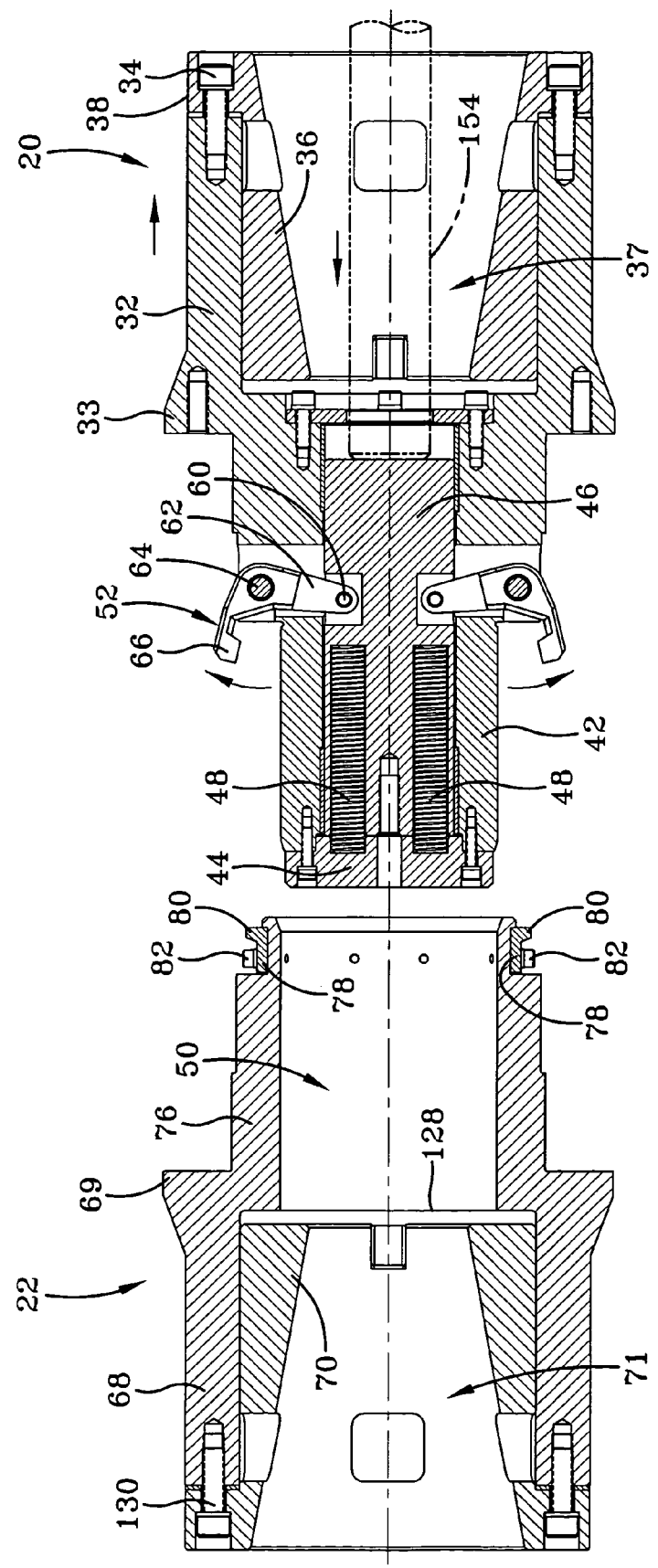
FIG. 12 is a longitudinal section view through the spindle units shown in the unmated configuration.
Figure 15A:
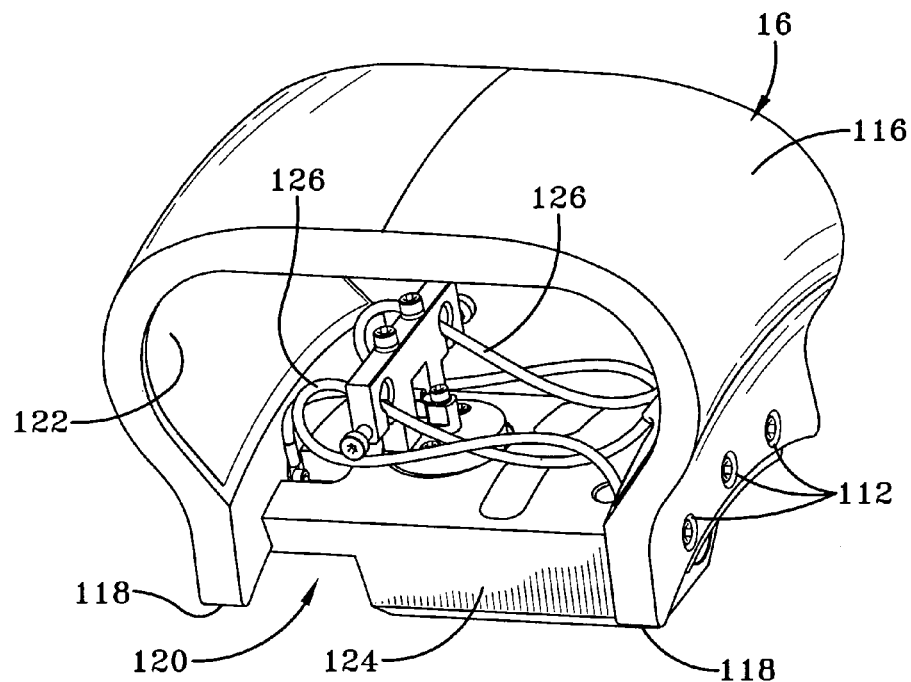
FIG. 15A is an end perspective view of a shell key segment.
Figure 15B:
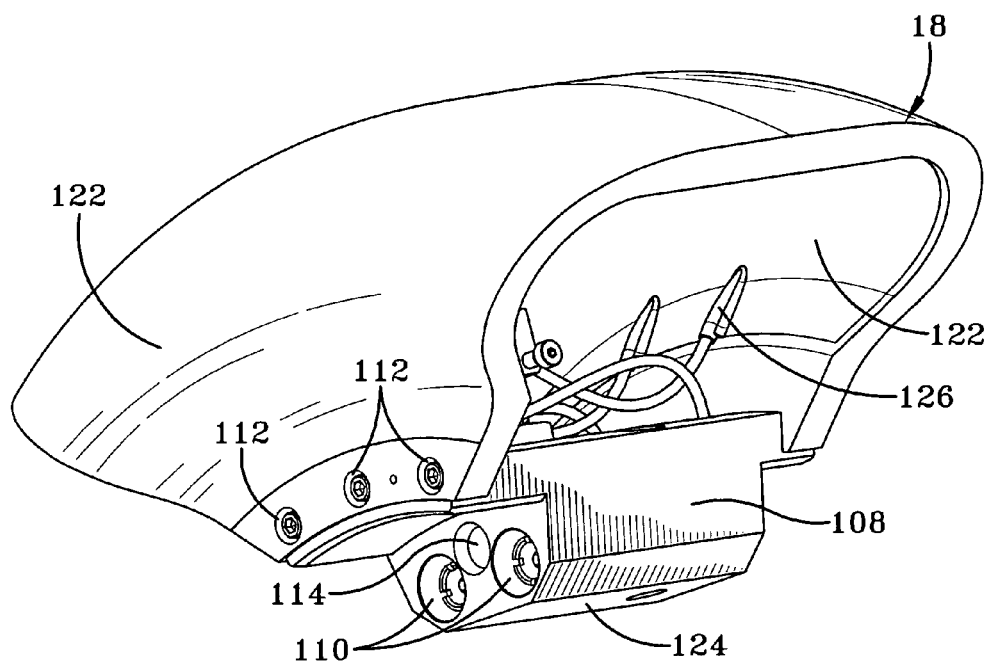
FIG. 15B is an end perspective view of a shell large segment.

Operation of the latching assembly will be described in reference to FIGS. 4, 11, and 12, 13, 14. FIGS. 12 and 14 show the spindle units 20, 22 (with the ring members removed for the purpose of illustration) in a separated, axially aligned orientation. The spindle units are transported by a separate transport mechanism that includes components fitting within axial passageway 71 of the insert body 70 and into axial passageway 37 of the insert body 36. The transport mechanisms transport the spindle units 20, 22 between the separated position (FIGS. 12 and 14) and the united position (FIGS. 11 and 13). In addition, the transport mechanism can function to transport the united shell assembly 12 and spindle assembly 14 (FIGS. 1 and 2) from a tire building location into a tire curing station as a unit. The transport mechanism for the spindle unit 20 includes an actuator rod 154 that engages the rearward end of actuator shaft 46 and pushes the shaft 46 into a forward position within the chamber 50. The pins 60 couple the arm 62 of each of the four (more or fewer latch arm assemblies may be deployed if desired) latch arm members 52, 54, 56, 58 to the actuator shaft 46. Each latch arm members 52-58 are pivotally attached at pin 64 to the cylindrical body 32 and rotates in reciprocal fashion as the actuator shaft 46 is moved into and out of the chamber 50. The actuator piston 154 presses the actuator shaft forward, compressing spring members 48, and causing the latch arm members 52-58 to rotate in the clockwise direction. Rotation of members in the clockwise direction separates the latch ends 66 of the members 52-58 from the actuator shaft 46 body into an "open" orientation. The clearance thus created allows the latch ends to pass over the raised flanges 80 in the respective locking sockets 78 mounted at the forward end of the cylindrical body 68 of the opposite spindle unit 22. The spindle units are moved axially toward each other and into the shell throughbore 152 with the latch members 52-58 in the open orientation. Once in the mated condition of FIGS. 11, 13 within the shell throughbore 152, the actuator rod 154 is withdrawn, releasing spring members 48 to push the actuator shaft 46 to the rear as shown by FIG. 11. Movement of the shaft 46 rearward causes the latch members 52-58 to rotate in the reverse counterclockwise direction. Such rotation moves the latch ends 66 of the latch members 52-58 to rotate into respective locking sockets 78 at the forward end of the spindle unit 22. Once within sockets 78, the latch members 52-58 latch the spindle units together and prevent an axial separation until removal of the spindle units from the shell throughbore 150 is desired.

Movement of the spindle units 20, 22 into the mated condition depicted in FIGS. 11, 13 acts to place the locating pins 102 into the sockets 114 of the shell segments, whereby self-aligning the spindle units 20, 22 with the shell assembly 12. In addition, in the mated condition, the electrical pins 104 of the ring member 26 are brought into a mating relationship with the electrical connectors 110 in the segment base units 108. As explained previously, the connectors 110 are wired to service the heating element of a respective shell segment 16, 18. Thus, axial movement of the spindle units 20, 22 serves to establish electrical interconnection between the connector sockets 92, 94, 96, 98 mounted to the rear end of the unit body 68 and the shell segment heating elements.

From FIGS. 3, 4, 11, 13, it will be noted that the assembled spindle assembly 14 may be used to transport the shell assembly 12 from one location, such as the tire building station, to another station such as the curing station. In addition, the outer surface 100 of ring member 26 and 146 of the ring member 24, with the spindle units in the mated condition, are disposed below the shell segment base plates 108. See FIG. 4. Thus, the ring members 24, 26 serve to support the segments in the assembled condition as tire components are added to the toroidal tire building surface created by shell segment surfaces 116.

It will be appreciated that the subject assembly provides a positive means of attachment between the tire building shell assembly or core 12 and any of the building, curing, or other stations involved in the manufacturing process. Since the attachment points are located in each end of the core (passageways 37 and 71), the attachment points may also be used by a device or devices that transport the core between the stations. The mechanism allows for automatic attachment and detachment by operation of the latch members 52-58 and provides sufficient accuracy and rigidity for the motions required for precision tire manufacture. The linkage driven latch members 52, 54, 56, 58 conveniently and efficiently lock the spindle units 20, 22 within the shell assembly 12, and thereby lock the shell segments 16, 18 into the united toroidal configuration useful for the tire building stage of manufacture.

In addition, the same axial relative movement between the spindle units 20, 22 that effects a latching of the units together, also is used for establishing the necessary electrical connection with shell segment heating elements. It will be noted that the electrical lines and connector disposition within the spindle units 20, 22, are internally disposed within the cylindrical bodies 68 and the ring member 26 and are thus protected from damage caused by contact with the external environment.

The subject core assembly mechanism provides a form on which components are assembled (segment surfaces 116) to form an uncured tire. The core assembly and uncured tire can be loaded into a mold for curing. During curing, the core provides additional curing heat through heating elements 122 on the inside surfaces of the shell segments forming the shape of the inside of the tire. The core is removed from the cured tire by disassembling it and removing the shell in segments. To detach the spindle units 20, 22, the segments are released by first removing the two spindle halves 20, 22. The spring mechanism holding the spindle units 20, 22 together hold the segments in place and support the shell segments against the high forces involved in molding the tire. The external actuator 154 in the core handling device releases the spindle latch, allowing the spindle halves 20, 22 to be disassembled axially. The action also disengages the electrical connections that transmit electrical power to the core segment heating elements.

Once the spindle assembly is removed, the segments are removed from the tire one at a time, starting with the alternate keying segments 16 shaped in the form of a wedge to allow such segments to be pulled radially inward into a mutually disassembled configuration. Once the keying segments 16 are removed, enough clearance exists to radially move the larger segments 18 inward and then removed axially from the tire.

The assembly thus provides a tire building core having internal heating and automatic disassembly capability. The use of a core improves the accuracy of placement of components because the tire is built near final shape upon the surfaces 116 of the shell segments. The entire core is held together with a single latching device as opposed to separate latches on each segment. Cycle time is thus reduced. The ring members 24, 26 provide pins 102, 106 that locate into sockets within the shell segments as the spindle units are axially mated. The outer surfaces of the ring members 24, 26 retain the segments and provide support. This pin and ring method of retaining the segments provides a robust support for the segments when they become subjected to substantial forces in the molding operation. The pin and ring method of retaining the segments also provides a guide to align the electrical connectors as the segments and the core are reassembled. Still further, the pin and ring method of retaining the segments provides a method of locating the segments accurately with a simple axial motion, facilitating alignment of the shell segments with tapers and facilitating automatic assembly and disassembly of the core and shell assembly components.

Referring to FIGS. 16, 17, 18, and 19, the core handling mechanism and latch actuator is sown in detail. Each side of the spindle assembly is engaged by a transport arm assembly 160 for the purpose of engaging and coupling to each spindle unit. So engaged, the arm assemblies on opposite sides may be employed to lift the shell assembly and spindle assembly as a unit and relocate the core assembly from station to station in the tire building procedure. Once relocated to any station, the arm assemblies may be released from respective spindle units if preferred or necessary or, alternatively, the arm assemblies may remain attached to respective spindle units during the tire building procedure at that particular station. The invention provides an efficient, quick, and reliable mechanism for attaching a core handling mechanism to the core assembly as will be explained.

Figure 16:
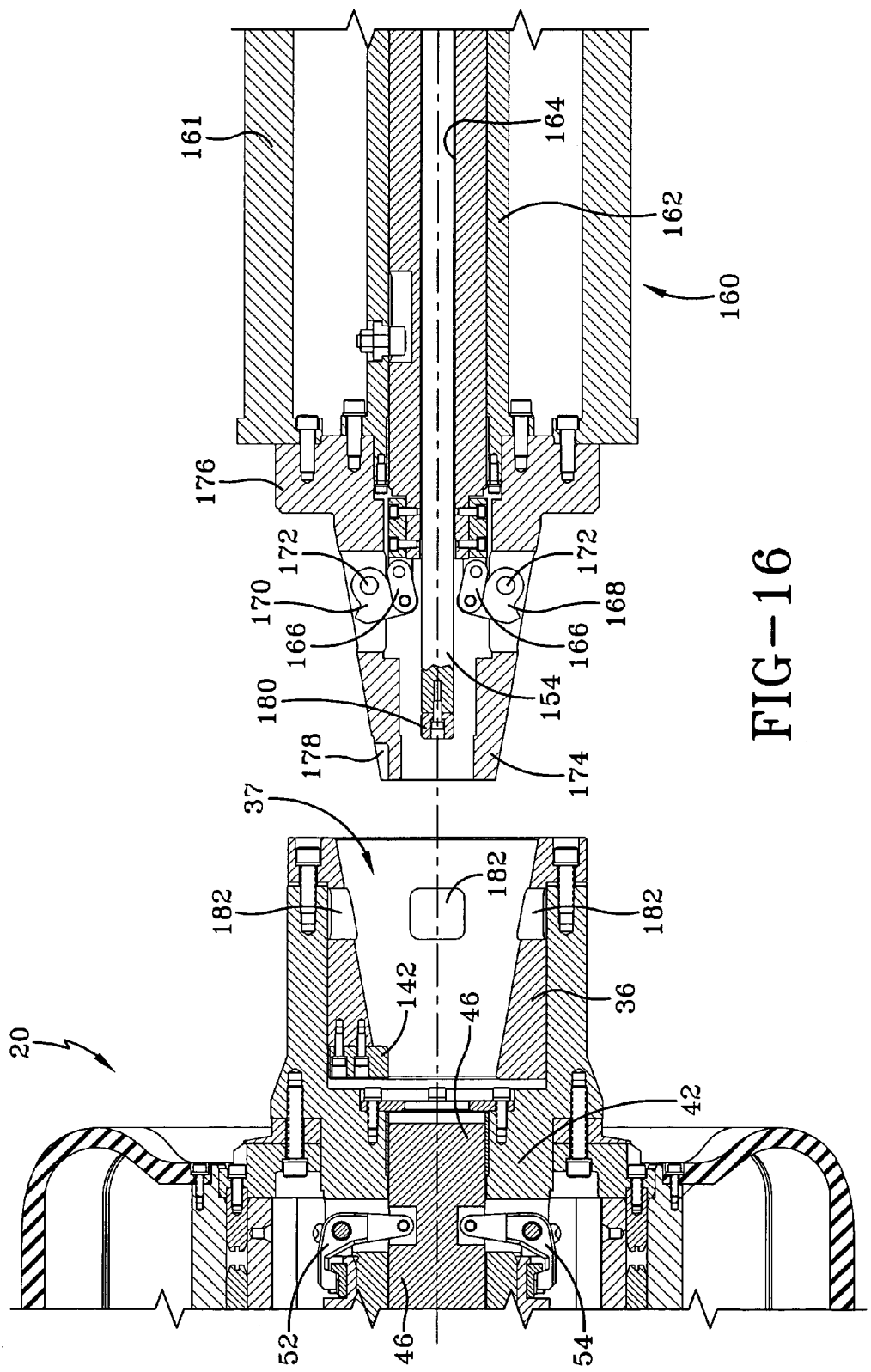
FIG. 16 is a longitudinal section view showing the rearward portion of the first spindle unit and a forward portion of the transport arm assembly moving into engagement with the first spindle unit.
Figure 17:
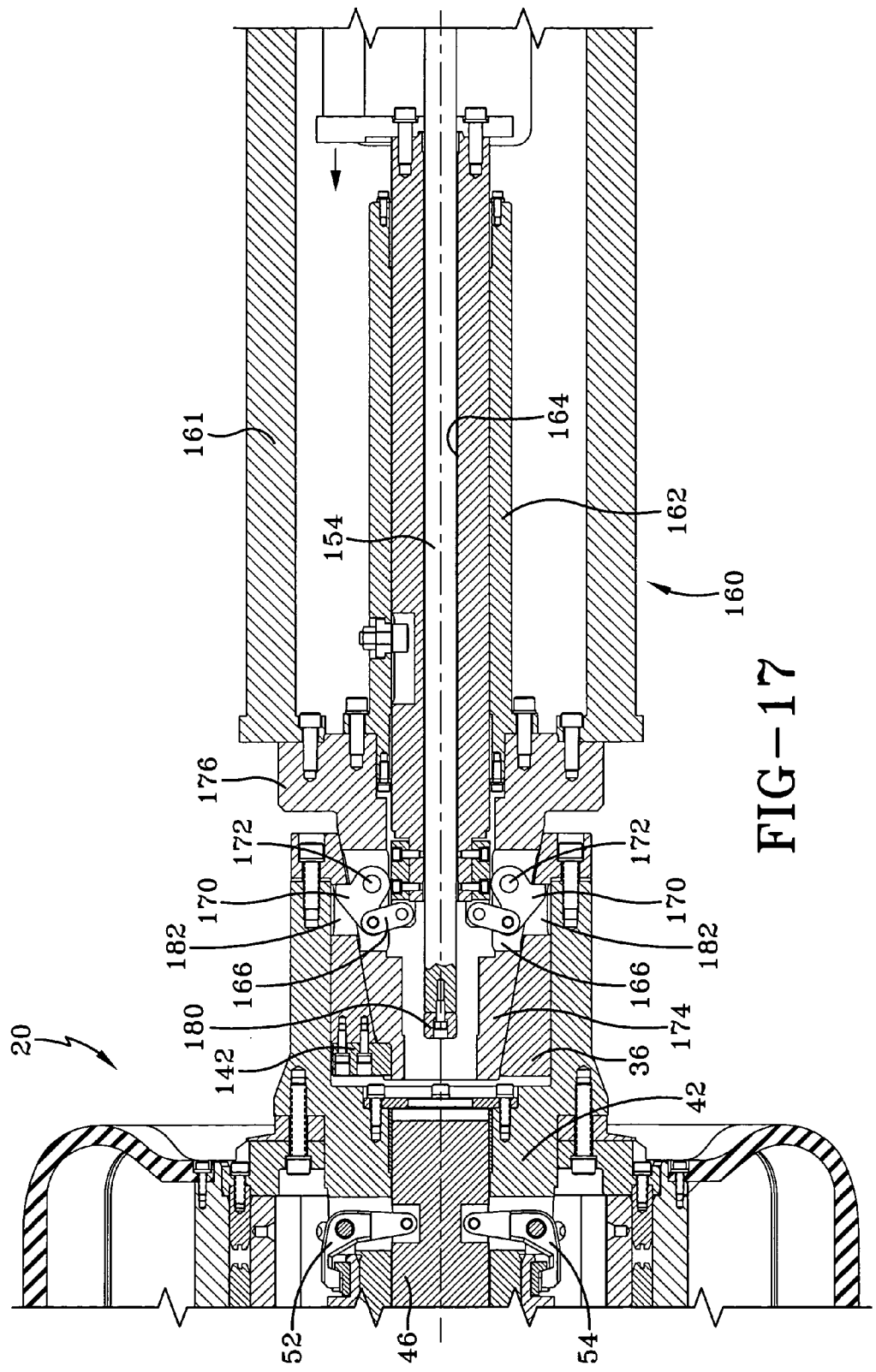
FIG. 17 is a view similar to that of FIG. 16 but showing the transport arm assembly in full mated engagement with the first spindle unit.
Figure 18:
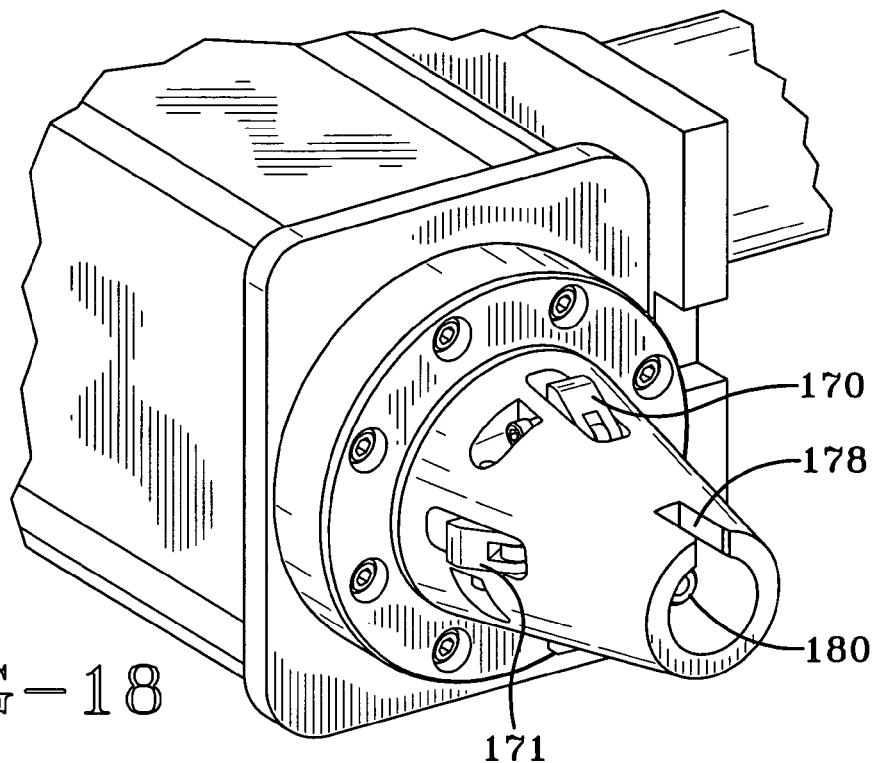
FIG. 18 is a front left perspective view of a forward end portion of the transport arm assembly with clamp fingers in the released position.
Figure 19:
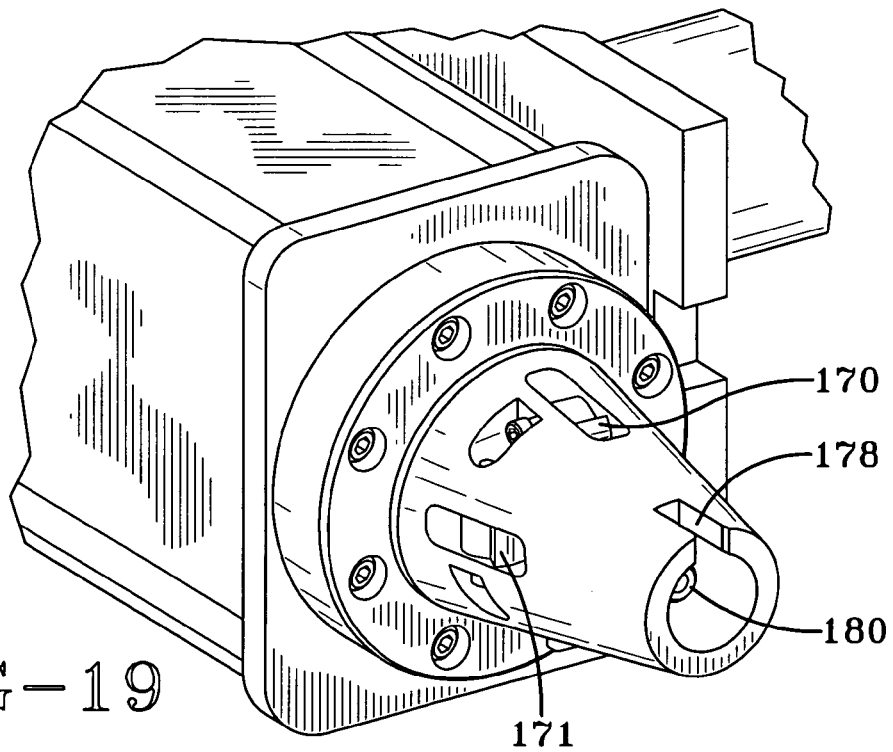
FIG. 19 is a front left perspective view similar to FIG. 18 showing the clamp fingers in the clamp position.

The arm assembly 160 for the latching spindle unit 20 is adapted to provide a latch actuation function not necessary at the opposite spindle unit 22 in the embodiment shown. However, it is within the contemplation of the invention that both spindle units may be adapted to include latching members that attach the spindle units to each other if desired. For the embodiment shown, the arm assembly 160 for the latching spindle unit 20 is configured as an elongate tubular body 161 having an inner axial sleeve 162 through which an axial bore 164 extends. The sleeve 162 extends forward to flanged end portions 166. Four circumferentially spaced clamp fingers are mounted to the forward end portions 166 of the sleeve 162. Two of the four clamp fingers, 168, 170 are oppositely disposed as shown in FIGS. 16 and 17. FIGS. 18, 19 show two adjacent clamp fingers 170, 171. Each of the clamp fingers is pivotally coupled by a pivot pin 172 to a frustro-conical nose portion 174 and projects through a respective opening in a side of the nose portion 174. The clamp fingers pivot about respective pivot pin 172 between an unclamped position in which the clamp finger is recessed within the nose portion 174 and a clamping position in which the latch finger projects from the outer surface of the nose portion 174. An inner end of each clamp finger is fixedly coupled to the remote end portions 166 of the sleeve 162. Sleeve 162 moves axially within 161, its movement being controlled by suitable drive means (not shown) such as hydraulic or electric motor. As sleeve 152 reciprocates axially, the clamp fingers are selectively pivoted between the clamping and unclamped positions.

The nose portion 174 of the arm assembly 162 terminates rearwardly at an outwardly projecting annular shoulder flange 176. The actuation rod 154 extends through the sleeve member 166 and independently is axially driven by suitable drive means (not shown). The range of movement of the rod 154 is such that it projects forward from the nose portion 174 at a forwardmost extent of its travel and is recessed within the nose portion 174 when retracted. The nose portion 174 is provided with an external axially extending keying depression 178. An end cap 180 is mounted over the end of the rod 154 as shown.

In operation, the arm assembly 160 and a companion arm assembly on the opposite side are coupled with a respective spindle unit 20, 22. The nose portion 174 is aligned axially with the chamber 37 of the insert body 36 as shown in FIG. 16 to initiate the coupling procedure. The nose portion 174 inserts into the rearward frustro-conical chamber 37 of the insert body 36 of spindle unit 20 upon appropriate alignment of the nose portion keying depression 178 with the keying projection 142 in the spindle unit body 36. FIG. 17 shows the nose portion fully inserted into the body 36 with the clamp fingers 170 in the unclamped position. The nose portion 174 and the chamber 37 are of complementary frustro-conical configuration with the chamber 37 sized to closely receive the nose portion 174 therein. Subsequent to insertion. The sleeve 162 is moved forward within body 161 to rotate the clamp fingers into the clamping position. The clamping fingers protrude from the nose portion 174 in the clamping position and extend into suitably positioned and sized openings 182 of the insert body 36. The clamping fingers thus serve to releasably latch the nose portion 174 to the spindle unit 20. To release the latching engagement, the sleeve 162 is moved rearward to reverse the rotation of the clamping fingers, moving the fingers into a recessed unlatched position within the nose portion 174. A decoupling of the arm assembly 160 from the spindle unit 20 may then be effected by an axial separation of the arm assembly from the spindle unit.

It will be appreciated that once the nose portion 174 is in mated engagement with the insert body 36 of the spindle unit 20, the actuation rod 154 is in axial alignment with the piston 46. The rod 154 may be extended axially from the nose portion 174 to engage the piston 46 and move the piston axially inward within the forward housing sleeve 42. As explained previously, an axially inward movement of the piston 46 effects a rotation of latching arms 52-58 into an unlocked position. The spindle units 20, 22 are thus decoupled and may be axially separated, each by a respective arm assembly 160. To couple the spindle units together, the actuator rod 154 is retracted within the nose portion 174, freeing the piston 46 to move outward under the influence of the biasing springs 48 as explained previously.

From the foregoing, it will be noted that the subject invention provides an improved core assembly handling mechanism. The mechanism provides a positive means of attachment between the tire building core assembly and any of the building, curing or other stations involved in the manufacturing process. The mechanism further provides a positive means of attachment between the core assembly for the purpose of unitary transportation of the core assembly between stations. The attachment points are located in each end of the core assembly. The mechanism allows for automatic attachment/detachment and provides sufficient accuracy and rigidity for the motions required for precision tire manufacture. The frustro-conical interface is of high structural integrity and operates to couple the arm assembly to the core assembly in a secure fashion.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tire building core assembly comprising:
   a shell assembly configured to provide an external tire-building toroidal surface and a central shell assembly throughbore having a central axis; and
   an elongate spindle assembly comprising first and second spindle units configured for extension into the shell assembly throughbore, wherein the spindle units are configured to couple within the shell assembly throughbore to maintain the shell assembly in an assembled configuration;
   wherein at least one of the spindle units includes a latching mechanism moveable between latched and unlatched positions for releasably coupling the first spindle unit to the second spindle unit, the latching mechanism including
   a piston cylinder extending from a forward end of the first spindle unit;
   a piston residing within the cylinder and moving reciprocally therein between a forward and a rearward position, said piston having a first end, a second end, and a central axis coaxial with the central axis of the throughbore;
   at least one latching finger coupled to the piston by a pivot at a location between the first and second ends, the latching finger including a latching end movable inwardly toward the piston into an engaged position with the second spindle unit and movable outwardly away from the piston into a disengaged position responsive to a location of the piston within the piston cylinder, wherein the first end of said piston may be engaged by an actuator to change the location of said piston within said piston cylinder and thereby move the latching finger between the engaged and disengaged positions; and
   a spring positioned at the second end of said piston and operative to bias the latching finger into the engaged position.

2. A tire building core assembly according to claim 1, wherein further comprising at least one external arm mechanism configured to couple with a protruding end of at least a first one of the spindle units extending from the shell assembly throughbore.

3. A tire building core assembly according to claim 2, wherein the protruding end forms an open socket for close receipt of a forward end of the arm mechanism.

4. A tire building core assembly according to claim 3, wherein the first spindle unit socket and the forward end of the arm mechanism are of a complementary substantially frustro-conical configuration.

5. A tire building core assembly according to claim 2, wherein the arm mechanism includes the actuator for engaging said piston, the actuator being mounted for reciprocating movement relative to said piston.

6. A tire building core assembly according to claim 4, wherein the arm mechanism forward end includes said actuator adapted to engage said piston thereby moving the latching mechanism from the latched position into the unlatched position.

7. A tire building core assembly according to claim 6, wherein the actuator moves reciprocally along the central axis through the arm mechanism forward end.

8. A tire building core assembly according to claim 1, wherein said piston further comprises an elongate, solid member having a surface at the first end through which the central axis extends and operatively engaged by the actuator.

9. A tire building core assembly according to claim 1, wherein said spring further comprises a coil spring received within the second end of said piston.

10. A tire building core assembly according to claim 1, further comprising:
a second latching finger coupled to said piston between the first and second ends, the second latching finger moving between an engaged position with the second spindle unit and a disengaged position responsive to a location of the piston within the piston cylinder, wherein the first end of said piston may be engaged by the actuator to change the location of said piston within said piston cylinder and thereby move the second latching finger.

11. A tire building core assembly according to claim 1, wherein said latching finger is pivotally coupled to said piston by a first pin and pivotally coupled to said first spindle unit by a second pin to facilitate movement between the engaged and disengaged positions.

12. A tire building core assembly according to claim 11, wherein said latching finger includes a first end and a second end, said first pin being located at said first end and said second end being engageable and disengageable with said second spindle unit in the respective engaged and disengaged positions, said latching finger extending through said first spindle unit with said second pin located between said first and second ends of said latching finger.

* * * * *